Nov. 26, 1968 J. E. TATSAK 3,413,108
GLASS FORMING MACHINE HAVING MOLDS
WITH MOVABLE BOTTOM SECTIONS
Original Filed Dec. 26, 1963

INVENTOR
JACK E. TATSAK

BY  *Oscar L. Spencer*

ATTORNEY

United States Patent Office 3,413,108
Patented Nov. 26, 1968

3,413,108
GLASS FORMING MACHINE HAVING MOLDS WITH MOVABLE BOTTOM SECTIONS
Jack E. Tatsak, Templeton, Pa., assignor to Pittsburgh Plate Glass Company, Pittsburgh, Pa., a corporation of Pennsylvania
Continuation of application Ser. No. 333,385, Dec. 26, 1963. This application June 13, 1967, Ser. No. 645,837
1 Claim. (Cl. 65—208)

ABSTRACT OF THE DISCLOSURE

A glass forming machine having movable molds for receiving a continuous solid stream of molten glass, in which the molds have upwardly extending walls and vertically movable valve members across the bottom thereof which have a depending extension which is engaged by a member for moving the valve upwardly or downwardly at selected velocities to prevent the formation of chill marks in the molded glass.

*Cross-reference to related application*

This application is a continuation of my copending application Ser. No. 333,385, filed Dec. 26, 1963, now abandoned and reference is made thereto in compliance with Title 35, United States Code, Section 120.

This invention relates to apparatus for forming glass, and more particularly to those glass forming machines which utilize a mold with a movable bottom section.

Molds with movable bottoms or "valves," as they are called, are known in the prior art. This invention is directed to various improvements in the means for moving the mold bottom downwardly as a charge of molten glass is fed into the mold.

As a mold bottom is being lowered, there is a tendency for some of the glass adjacent to the mold walls to solidify and roll into the molten mass, producing irregularities known as "chill mark." By controlling the movement of the valve bottom so that a uniform velocity is maintained, "chill mark" is greatly reduced.

Furthermore, automatic coordination of the lowering of the mold bottom with the other operations of the machine will permit accurate control of the volume of glass in a gob than was possible using only manual control.

It is an object of this invention to produce an improved product, particularly an optical lens blank, which has a relatively smooth peripheral surface which has been in contact with the mold walls.

Another object is to provide apparatus for lowering the mold bottom in coordination with the cycle of a glass press or similar machine.

Still another object is to provide apparatus for guiding a portion of a movable mold bottom into engagement with a member which subsequently imparts motion to the mold bottom.

A further object is to lower the mold bottom at a uniform velocity in order to reduce the presence of chill marks on the glass product.

Basically, the invention is applied to machines of the type which have molds with vertical interior walls and vertically movable bottom molding members. An extension is attached to the underside of the bottom member, and this extension has a pair of spaced apart enlarged portions which are separated by a relatively narrow portion. A vertically movable member located beneath the mold is used to engage the projection and move the mold bottom relative to the mold walls. The vertically movable member has a pair of spaced apart arms which fit between the enlarged portions of the bottom member extension. Means are provided for moving the vertically movable member downwardly at a constant velocity, in order to similarly lower the mold bottom.

A more complete understanding of the invention may be had by referring to the following description and the drawings, wherein.

Figure 1:
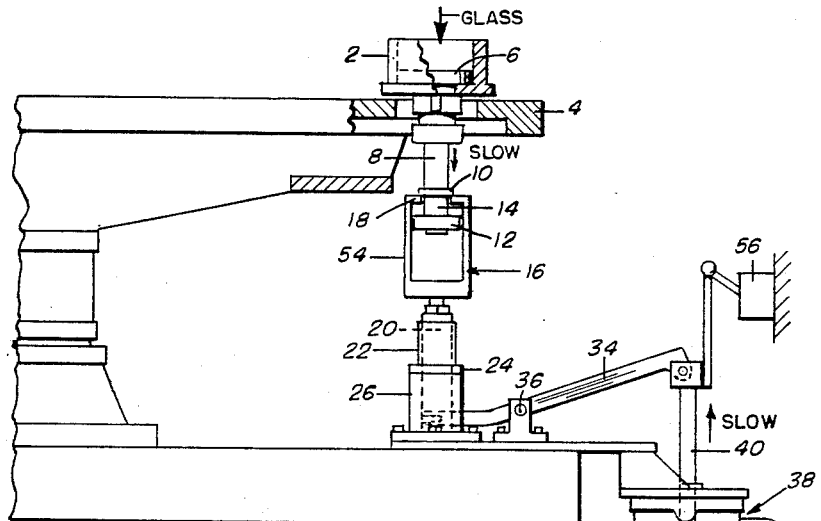
FIG. 1 shows an elevational view of the apparatus of the invention, during the lowering of the mold bottom.
Figure 2:
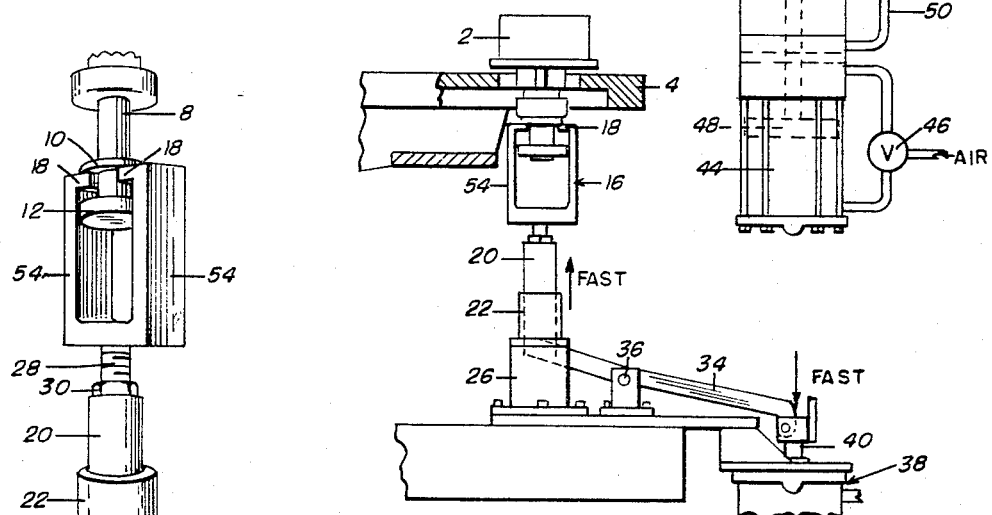
FIG. 2 shows a view similar to that of FIG. 1 during the period of the cycle when the mold bottom is moving upwardly.
Figure 3:
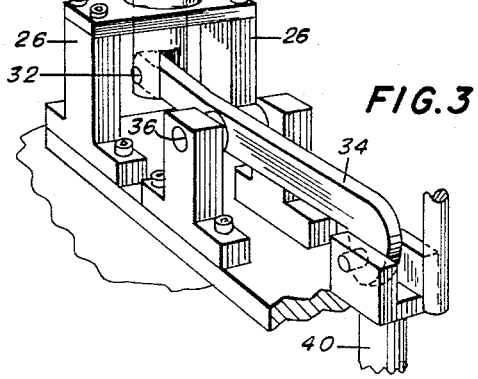
FIG. 3 is a perspective view of the apparatus.

The overall arrangement to which this invention relates may be seen in FIG. 1. The mold 2 is one of a plurality of similar molds which are supported on a table 4. The table rotates intermittently so that the molds are moved from one indexed position to another. At each indexed position, mechanical operations may be performed on the glass gob within the mold by various types of automatic machinery.

The mold 2 is shown in the indexed position at which it is filled with a charge of molten glass. Conventionally, the glass is fed from an overhead container which has a dispensing orifice in its lower wall. Molten glass flows into the mold in a continuous stream until the desired amount is in the mold.

When optical blanks are formed in the above-described manner, it has been found that the quality may be improved by providing a vertically movable bottom member 6 in the mold, which member is slowly lowered as the glass is fed into the mold. This is particularly true when large gobs are formed into lens blanks having a thickness of ¾ inch or greater. Some unusually large lens blanks weighing almost one pound and being almost 2 inches thick have been produced using this apparatus. Previously, lowering of the mold bottom has been done manually, and the timing cycle of the machine was manually interrupted while the mold bottom was moved in this manner. Using the apparatus shown herein, the lowering of the mold bottom is automatically coordinated with the operation of the machine, and the velocity of the downward movement of the mold bottom is precisely maintained at a constant velocity.

Turning again to FIG. 1, it will be seen that the valve or mold bottom 6 has an attached extension 8 projecting therebeneath. On the projection is an upper enlarged portion 10 spaced apart from a lower enlarged guide portion 12. A relatively narrow portion 14 lies between the enlargements 10 and 12.

Immediately beneath the mold 2 is a claw-like member 16 which is movable along a fixed vertical axis. At the upper end of the claw, a pair of opposed arms 18 are shown to be engaged about the extension 8 at a point between the enlarged portions 10 and 12. The arms 18 are spaced apart a distance slightly greater than the thickness of the relatively narrow portion and less than the thickness of the enlarged portions 10 and 12; all distances being measured along an axis parallel to the plane of FIG. 1. Therefore, when the member 16 is moved vertically, the bottom of the mold is similarly moved, due to the contact of the arms 18 with the upper enlarged portion 10.

The means for moving the claw-like member 16 includes a rod 20 slidably mounted in a stationary sleeve 22. The sleeve 22 is supported by a plate 24, and upright brackets 26 which are attached to the frame of the macludes a rod 20 slidably mounted in a stationary sleeve into an axial recess in the rod 20. The height of the member 16 may be adjusted and then secured by means of a lock nut 30.

The lower end of rod 20 is bifurcated and has a pin 32 extending therethrough. This pin receives a bifurcated end portion of a lever arm 34 (see FIG. 1), so that the rod will be moved by the lever. The lever 34 is pivoted at 36.

A hydraulic-pneumatic unit, generally designated 38, has its piston rod 40 pivotally attached to the lever arm 34. Thus, the movement of the piston rod 40 is used to impart vertical motion to the claw-like member 16.

It is highly desirable to move the mold bottom downwardly at a constant velocity, and this is accomplished through the use of the hydraulic-pneumatic unit 38. Conventional expansible chamber units having a single piston and using a single fluid are generally incapable of producing the preferred constant velocity movement.

To provide a constant velocity, a double piston and cylinder device is used. The upper unit 42 operates with an incompressible hydraulic fluid, and the lower cylinder 44 operates with a compressible fluid medium such as air. The air cylinder provides the force to move the piston rod and the hydraulic cylinder is employed to control the velocity at which the rod moves. The construction of these units is illustrated diagrammatically only, and obviously various other types of expansible chamber motors may be used.

The air to the pneumatic unit 44 is controlled by a slide valve 46 which is automatically shifted from one position to another in coordination with the operation of the other elements of the machine. In one position of the valve 46, air is led to the upper side of the piston 48 and vented from the lower side thereof, while the other position of the valve permits venting of the upper side and delivers pressure to the lower side. A microswitch 56, which is tripped by an extension of the rod 40 at the end of its upward stroke, may be used to shift the valve 46.

The hydraulic unit 42 has a closed circuit conduit 50 leading from one side of the piston to the opposite side. Any suitable flow controlling device such as a valve 52 is used to limit the flow of the fluid through the conduit and consequently reduce the velocity at which the piston rod 40 may travel.

It is desirable to have the rod 40 move upwardly at a relatively low velocity so that the claw-like member 16 will move slowly. The return stroke of the piston may be relatively rapid. To accomplish this, the valve 52 may impede the flow of hydraulic fluid in one direction, during the upward movement of the piston rod 40; and permit free flow of the fluid in the opposite direction, during the downward stroke.

During the operation of the machine, a series of molds 6 are moving one-by-one into engagement with the vertically movable member 16 which is located in the path followed by the extensions 8 depending from the mold bottoms 6.

As each extension 8 moves into the indexed position where its mold is to receive a charge of molten glass, the mold bottom will be at its lowermost position. The arms 18 will be in a common horizontal plane with the narrow portion 14. After the extension stops between the arms 18 on the member 16, the member 16 is moved upwardly. The glass is then placed in the mold as the mold bottom 6 is moved downwardly at a constant velocity. So that the mold bottom 6 will be traveling at a uniform velocity when it reaches its lowermost position, a slight amount of free movement is provided by spacing the enlarged portions 10 and 12 apart a distance greater than the thickness of the arms 18. As shown in FIG. 1, the upper enlargement 10 rests on arms 18 when the mold is moving downwardly. After the mold bottom 6 comes to rest at its lowermost position, the claw-like member 16 may then continue its movement for a short additional distance.

It will be observed that one of the primary purposes of the lower enlarged portion 12 is to guide properly the extension 8 and the claw-like member 16 into engagement with each other as a mold is moving into the indexed position shown. This enlarged portion 12 is preferably of circular horizontal cross-section and it may be rotatably mounted about the extension 8 in order to facilitate the engagement of these units. Preferably the dimension of this enlarged portion 12 is only slightly less than the distance between the upstanding arms 54 of the member 16. This dimension is measured transversely both to the path taken by the extension and to the axis along which the claw-like member 16 moves. The opposed arms 18 may be considered to define a first passage through which the narrow portion 14 of the extension 8 passes; while the upstanding arms 54 define a second passage through which the lower enlarged portion 12 passes. These passages are parallel to the path taken by the extension 8, and the arms 54 surrounding the second passage serve as guide means for bringing the members 8 and 16 into proper engagement.

The above-described embodiment is only one form which the invention may take. Various modifications thereto are obvious. The scope of the instant invention is set forth in the claim which follows.

What I claim is:

1. A glass forming machine comprising
    means for continuously feeding a solid stream of molten glass downwardly from one position to a selected position therebelow,
    a plurality of molds mounted for intermittent rotary movement, horizontally, through said selected position, said molds each being open at the bottom and having upwardly extending side walls,
    a valve member in each of said molds at the bottom thereof and extending across said bottom opening therein, each said valve member being mounted for vertical movement within said mold,
    a depending extension member secured to each mold bottom valve member, said depending extension members each having a vertically spaced pair of laterally extending enlarged portions,
    a vertically movable valve extension engaging member located below said selected position and adapted to receive, in aligned relationship, each said mold depending valve extension member during the rotary movement of said molds,
    a laterally extending arm on said valve extension engaging member disposed between said spaced enlarged portions of said depending extension, each said arm of said valve extension engaging member being positioned freely, vertically and movable between said enlarged portions to engage and move one of said enlarged portions of said depending extension in a vertical direction during the vertical movement of said extension engaging member,
    means for indexing each of said molds, sequentially, to said selected position and the depending extension of the valve thereof into alignment with said vertically movable extension engaging member,
    means for moving said extension engaging member and the valve aligned therewith upwardly at a high velocity to move said valve to a first upper position to receive from said molten glass feed means a solid stream of glass thereon, and
    means for moving said extension engaging member and the valve aligned therewith downwardly while said solid stream of molten glass is continuously deposited on said valve at slow uniform velocity to a second lower position,
    whereby to reduce chill marks caused by glass adjacent the mold walls solidifying and rolling into the molten glass being deposited in said mold.

References Cited

UNITED STATES PATENTS

| 2,433,013 | 12/1947 | Ziegler | 65—184 XR |
| 2,030,328 | 2/1936 | Schutz | 65—242 XR |
| 3,166,803 | 1/1965 | Ruckstuhl | 65—323 XR |
| 1,292,051 | 1/1919 | Rau | 65—242 |
| 3,296,345 | 1/1967 | Dietz. | |

FOREIGN PATENTS

| 242,310 | 9/1946 | Switzerland. |
| 116,682 | 11/1898 | Germany. |
| 60,462 | 3/1912 | Switzerland. |
| 113,869 | 7/1899 | Germany. |

DONALL H. SYLVESTER, *Primary Examiner.*

F. W. MIGA, *Assistant Examiner.*